Oct. 27, 1959  M. BEAUVAIS  2,909,986
COOKING APPARATUS FOR PRESERVES IN TINS
Filed Jan. 28, 1957  2 Sheets-Sheet 1
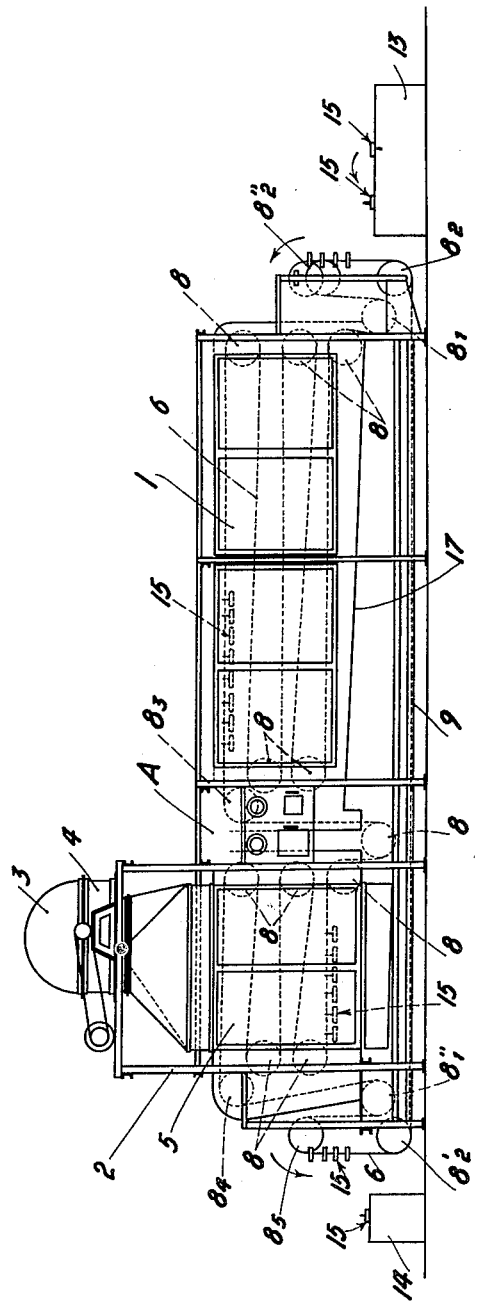
INVENTOR
MAX BEAUVAIS
BY
Pollard Johnston Smythe and Robertson
ATTORNEYS Oct. 27, 1959     M. BEAUVAIS     2,909,986
COOKING APPARATUS FOR PRESERVES IN TINS
Filed Jan. 28, 1957     2 Sheets-Sheet 2
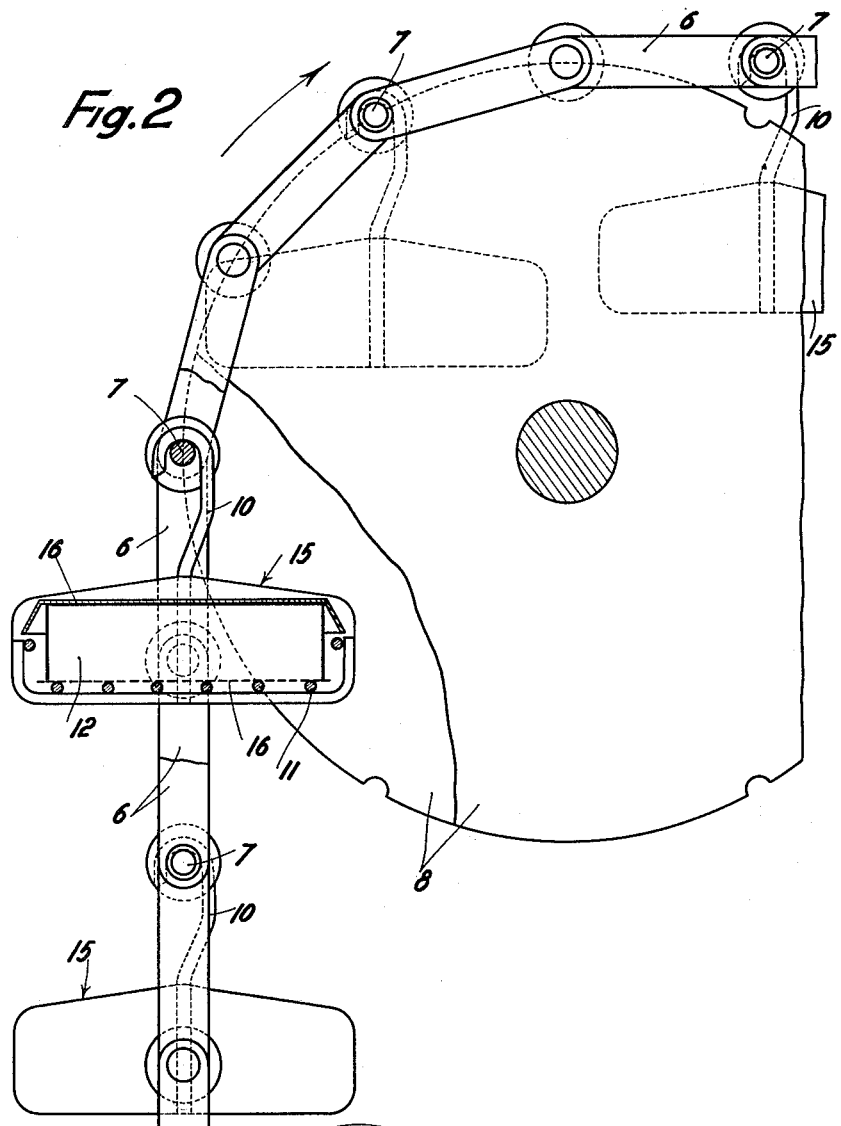
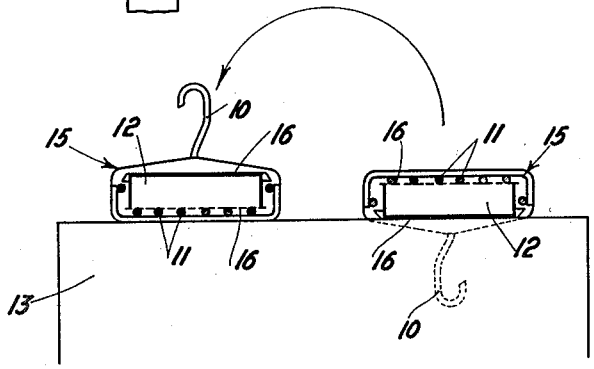
INVENTOR
MAX BEAUVAIS
BY
Pollard Johnston Smythe & Robertson
ATTORNEYS

United States Patent Office 2,909,986
Patented Oct. 27, 1959

2,909,986
COOKING APPARATUS FOR PRESERVES IN TINS

Max Beauvais, Paris, France

Application January 28, 1957, Serial No. 636,739

Claims priority, application Morocco January 30, 1956

6 Claims. (Cl. 99—361)

The present invention relates to a cooking apparatus for preserves in tins; it is more particularly applicable to the application of the process in which the tins, filled with the raw product and open at one face, are put into circulation with their open faces directed downwards, first in an atmosphere of steam until the product to be preserved has been cooked right through, and then in a current of heated air at an average temperature until dried, the speed of circulation of the tins, the temperatures of the steam and of the air and the rate of flow of air being regulated in such manner that the cooking times and the drying times are the same for all of the cans or tins.

Apparatus are already known which can carry this process into effect; they comprise a cooking installation and a drying installation mounted one following the other, with continuous conveyor devices, entry chamber, outlet chamber and intermediate chamber between the cooking section and the drying section. These apparatus which already enable a substantial increase in operating speed to be obtained, have still the drawback of being bulky and relatively complicated. Efforts have been made to construct an apparatus which is more easily handled, has a smaller bulk and in addition which can be used at will without any dismantling, either for cooking and drying or for drying the products.

To this end, a cooker for preserves in tins with devices for drying and cooking and conveyor apparatus consists essentially, in conformity with the present invention, in that a drying oven and at least one cooking oven are mounted one in succession to the other, the continuous conveyor apparatus being formed by two parallel articulated chains coupled together at intervals by shafts on which are freely suspended hanging trays in which the tins to be treated are placed with their openings downwards, the chains of the conveyor device being guided, driven and tensioned by any known means, the lower entry pulleys in the cooking oven and the return pulley in the drying oven being situated in the same horizontal plane.

The invention is explained in more detail in the description given below of one of its preferred forms of embodiment, reference being made to the accompanying drawings, in which:

Fig. 1 shows a side elevation of the assembly of an apparatus in accordance with the invention.

Fig. 2 shows diagrammatically a vertical cross-section of a portion of the conveyor device with its hanging trays carrying tins to be treated.

Fig. 3 shows a diagram of the loading of the tins.

As shown in Fig. 1, the apparatus is constituted first of all by a tunnel oven 1 suitably closed and comprising all suitable means for the reception of waste from the products, for the introduction, circulation and recovery of the live steam used for the cooking process; a drying oven 2 follows the oven 1; it is surmounted in the known manner by a heat exchanger 3 and a fan 4 which sends a flow of hot air, the hygroscopic degree of which can be varied at will, into the lateral casings and into the drying chamber 5. A free space A separates the ovens 1 and 2.

The conveyor device is constituted by two endless parallel articulated chains 6 which are respectively movable on opposite sides of the ovens. A certain number of corresponding articulated sections are coupled together by shafts 7; these chains are guided and driven by means of pulleys 8 arranged inside the ovens 1 and 2 through which the chains pass without any interruption and without the interposition of any special jigging means between the outlet of the oven 1 and the entry of the oven 2.

In accordance with the invention, in order to avoid leakages of steam, the pulleys $8_1$ and $8'_1$ respectively arranged in the entry (lower portion) of the oven 1 and in the free space formed between the two ovens, have their axes in the same horizontal plane; the same arrangement is preferably made with the return pulley $8''_1$ at the outlet of the oven 2.

The chains 6 are protected by a cover 9, in particular when returning from the outlet of the oven 2 (pulley $8'_2$) to the entry of the oven 1 (pulley $8_2$). The pulleys 8 are driven by any suitable means; some of them may act as jockey pulleys for the chains 6.

On the shafts 7 are hung vertically hooks 10, at the free lower extremity of each of which is fixed, by welding or other means, a grid 11 on which the cans 12 to be treated will be arranged bottom upwards, as will be explained later. The assembly formed by the hooks 10 and the grids 11 will be termed hereinafter "hanging trays" 15; it will be seen that all the grids of the hanging trays remain horizontal during the whole of their progress through the two ovens.

At the entry of the oven 1, the chains 6 follow a vertical path between the pulley $8_2$ and the jockey pulley $8''_2$. In the extension of the oven 1 is arranged a loading table 13; at the outlet of the oven 2 a table 14 is provided for unloading the treated cans.

The hanging trays pass into each of the ovens from the bottom.

The operation of this apparatus is as follows: If it is assumed that sardines are to be treated, the tins 12 filled with raw fish, and formed as shallow cans or tins open at their top sides, arrive at the loading table 13 where they are placed on an unperforated plate 16; a hanging tray 15 (which is preferably of stainless steel) is then placed over the cans, and the whole is then turned over (see Fig. 3) so as to present the cans with their openings downwards, the hanging trays being then hooked on to the shafts 7 of the chains 6 which pass between the pulleys $8_2$—$8''_2$. Driven by the movement of the chains, the hanging trays pass into the oven 1 through which they pass several times in each direction (five times in the example shown) and in which they are subjected to the action of the live steam introduced into the oven in order to obtain a temperature up to 100° C. When the hanging trays arrive at the upper left hand extremity of the oven 1, the fish is cooked right through, and the trays move down into the space A formed between the two ovens, from the pulley $8_3$ to the pulley $8'_1$. The fatty waste and water produced are evacuated on the steel sheet 17. From the pulley $8'_1$ the hanging trays move upwards by three longitudinal to-and-fro movements to the upper part of the drying oven 2. During their passage through the said finishing oven (which is provided for the purpose of drying the fish on its internal and external faces by virtue of the continuously reversed position of the can), the hanging trays 10—11 are subjected to the drying air sent by the fan 4 into the chamber 5 at a temperature of 100 to 150° C. and at a speed of about 6 to 8 metres per second. At the upper part of the oven 2, the cans are at a temperature of about 99° C.; the hanging trays move downwards from the pulley $8_4$ to the pulley $8''_1$ and then move up to the pulley $8_5$. Finally, during the vertical downward travel from the pulley $8_5$ to the pulley $8'_2$, the hanging trays are unloaded and the cans are sent to the oil filling and sealing devices. The baskets and the back plates are re-loaded with uncooked tins; the drying air returns to the fan.

The speed of rotation of the pulleys 8 is such that the cooking and the drying of a can take about 20 to 40 minutes.

In accordance with the invention, the cooking oven and/or the drying oven may comprise different numbers of stages of pulleys, that is to say the times of travel of the cans inside the ovens may be fixed as a function of the nature of the products to be treated.

A number of cooking ovens may also be mounted, one after the other; to this end, it is only necessary to interpose supplementary chests between the end chests (fitted with guiding pulleys) and to increase the length of the chains in consequence.

Finally, for certain treatments with air only with any suitable hygroscopic degree, without previous cooking by steam, the hanging trays may be directly loaded in the space comprised between the cooking and drying ovens, or again in a more advantageous manner, the direction of rotation of the pulleys may be reversed and the hanging trays may be loaded at the extremity which, in the example given above, forms the outlet side of the apparatus.

The second oven, which has been referred to above as the finishing oven, may furthermore work with live steam so as to complete the cooking stage, when so required.

What I claim is:

1. An apparatus for cooking and drying raw food products in cans open at one face, comprising a drying oven and at least one separate cooking oven aligned longitudinally with said drying oven; two parallel articulated endless chains constituting a conveyor device, said chains passing first through one of said ovens a plurality of times and then through the other of said ovens a plurality of times; transverse shafts coupling oppositely located links of said chains at intervals along the lengths thereof; a multiplicity of hanging trays each having a grilled base to drain liquid therethrough, said trays being freely suspended from said shafts to swing thereon and being adapted to receive and hold said cans containing said products with the open faces of said cans placed downwards on said grilled bases to drain off liquids through said bases during the cooking and drying processes and to facilitate cooking and drying; means for driving, guiding and tensioning said conveyor chains, including entry pulleys guiding said chains into said cooking oven and return pulleys guiding said chains from said drying oven, said entry and return pulleys being located in the same horizontal plane and near the bottoms of said ovens to minimize losses of heat from said ovens; said chains having a flight leading to said entry pulleys for feeding said trays into the bottom portion of said cooking oven, and having a flight passing from said return pulleys to a location outside said drying oven where treated cans may be removed from said trays.

2. An apparatus for cooking and drying raw food products in cans open at one face, comprising a drying oven and at least one separate cooking oven aligned longitudinally with said drying oven; two parallel articulated endless chains constituting a conveyor device, said chains passing first through one of said ovens a plurality of times and then through the other of said ovens a plurality of times; transverse shafts coupling oppositely located links of said chains at intervals along the lengths thereof; a multiplicity of hanging trays each having a grilled base to drain liquid therethrough, said trays being freely suspended from said shafts to swing thereon and being adapted to receive and hold said cans containing said products with the open faces of said cans placed downwards on said grilled bases to drain off liquids through said bases during the cooking and drying processes and to facilitate cooking and drying; means for driving, guiding and tensioning said conveyor chains, including entry pulleys guiding said chains into said cooking oven and return pulleys guiding said chains from said drying oven, said entry and return pulleys being located in the same horizontal plane and near the bottoms of said ovens to minimize losses of heat from said ovens; said means also including pulleys guiding said chains through an upright loading flight outside said cooking oven, in which flight cans to be treated may be placed on said trays and from which said chains pass to said entry pulleys to feed said cans into the bottom portion of said cooking oven, and pulleys guiding said chains from said return pulleys through an upright unloading flight outside said drying oven, in which treated cans may be removed from said trays; said chains passing directly from said unloading flight back to said loading flight.

3. An apparatus as claimed in claim 1, said cooking oven having a sloped bottom wall to receive and carry off liquid drained from the cans and trays in that oven.

4. An apparatus as claimed in claim 1, each of said trays being suspended by means of an arm connected with the base of the tray and formed with a hooked end hung freely and removably over one of said shafts.

5. An apparatus as claimed in claim 1, said conveyor device having flights of different lengths in said cooking oven and said drying oven, respectively, whereby said cans may be treated for different periods of time in said ovens.

6. An apparatus as claimed in claim 1, said drying oven being separated from said cooking oven by an open space, said conveyor device extending through an upright flight in said open space between said ovens, in which flight said trays may be loaded with cans containing products to be treated.

References Cited in the file of this patent

UNITED STATES PATENTS

| | | |
|---|---|---|
| 2,528,069 | McGihon | Oct. 31, 1950 |
| 2,709,139 | Voytilla | May 24, 1955 |
| 2,741,978 | Cheftel et al. | Apr. 17, 1956 |

FOREIGN PATENTS

| | | |
|---|---|---|
| 1,028,480 | France | Feb. 25, 1953 |